(12) United States Patent
Minekawa et al.

(10) Patent No.: US 11,256,050 B2
(45) Date of Patent: Feb. 22, 2022

(54) OPTICAL COMMUNICATION MODULE

(71) Applicant: Lumentum Japan, Inc., Kanagawa (JP)

(72) Inventors: Hayato Minekawa, Kanagawa (JP); Shigeru Tokita, Kanagawa (JP); Koichi Omori, Chiba (JP); Akihiro Hayami, Kanagawa (JP); Saki Narisawa, Kanagawa (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/864,994

(22) Filed: May 1, 2020

(65) Prior Publication Data
US 2020/0355881 A1    Nov. 12, 2020

(30) Foreign Application Priority Data

May 10, 2019 (JP) .............................. JP2019-089516

(51) Int. Cl.
*G02B 6/42* (2006.01)

(52) U.S. Cl.
CPC ......... *G02B 6/4286* (2013.01); *G02B 6/4274* (2013.01)

(58) Field of Classification Search
CPC .......................... G02B 6/4286; G02B 6/4274
See application file for complete search history.

(56) References Cited

U.S. PATENT DOCUMENTS

2018/0267257 A1*  9/2018  Aboulhouda ........... H01S 5/042
2018/0292619 A1   10/2018  Zheng
2019/0285815 A1*  9/2019  Sugiyama ............ H04B 10/801

FOREIGN PATENT DOCUMENTS

JP          2009165040 A     7/2009

* cited by examiner

*Primary Examiner* — Sung H Pak
*Assistant Examiner* — Hoang Q Tran
(74) *Attorney, Agent, or Firm* — Harrity & Harrity, LLP

(57) ABSTRACT

An optical communication module includes a first power-supplied terminal to be brought into contact with a first power supply terminal to have a first power supply voltage applied thereto; a second power-supplied terminal to be brought into contact with the second power supply terminal to have a second power supply voltage applied thereto; a signal processing circuit, which is connected to the first power-supplied terminal and the second power-supplied terminal, configured to perform processing on a signal; and a power control circuit, which is provided between the first power-supplied terminal and the signal processing circuit, configured to control connection between the first power-supplied terminal and the signal processing circuit based on a voltage applied to the second power-supplied terminal.

10 Claims, 8 Drawing Sheets

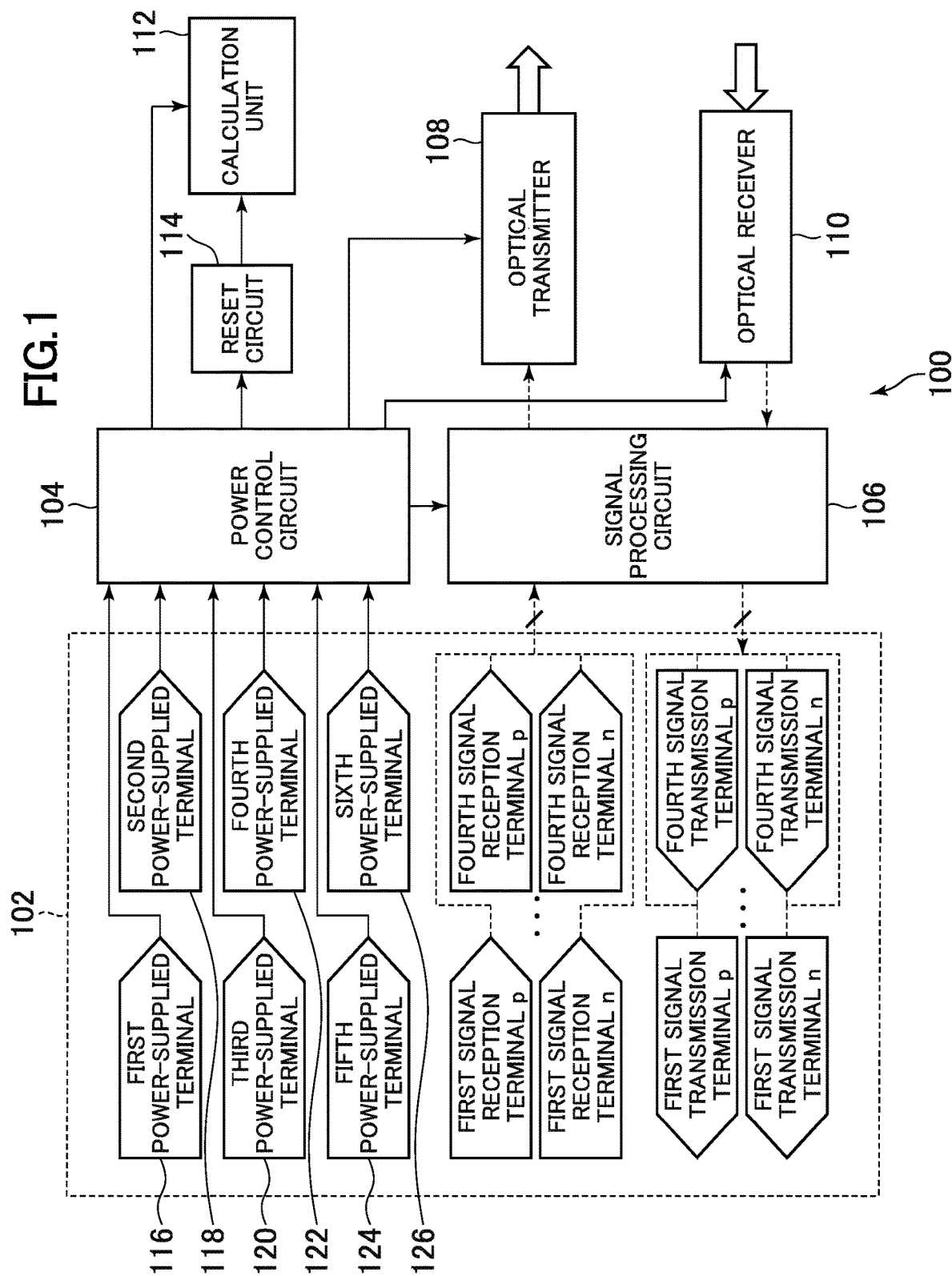

OPTICAL COMMUNICATION MODULE

CROSS-REFERENCE TO RELATED APPLICATION

The present application claims priority from Japanese patent application JP 2019-089516 filed on May 10, 2019, the content of which is hereby incorporated by reference into this application.

TECHNICAL FIELD

The present disclosure relates to an optical communication module.

BACKGROUND

In recent years, in order to cope with increases in speed and scale of communication systems that accompany an increase in communication traffic, optical fiber communication has been used as a method for information transmission between communication devices.

Communication devices configured to perform communication through use of optical fiber communication include an optical communication module configured to perform signal processing for converting an optical signal into an electric signal, converting an electric signal into an optical signal, amplifying a signal, modulating and demodulating a signal, and the like. As the optical communication module, there is used an optical communication module that can be inserted into and removed from an opening (for example, an edge connector) provided to a host device.

In an optical communication module, terminals for receiving power supply from a host device and terminals for transmitting and receiving signals are arranged. The shapes and arrangement of the terminals are standardized. For example, there is a standard in which a plurality of power-supplied terminals are arranged in order to have a plurality of kinds of power supply voltages supplied to both a front surface and a back surface of a board included in an optical communication module.

In an optical communication module having two lines of power supply paths, switches may be provided to both the two lines of power supply paths. The switches are brought into an on state when power is supplied to the two lines of power supply paths.

There is another standard for shapes of terminals arranged in an optical communication module in alignment with each other in its insertion direction into a host device. With this standard, the host device includes a first power supply terminal and a second power supply terminal located closer to an opening than the first power supply terminal when viewed from the host device. Meanwhile, in the optical communication module, a first power-supplied terminal and a second power-supplied terminal are arranged in such a manner that, when the optical communication module is completely inserted into the host device, the first power-supplied terminal is brought into contact with the first power supply terminal to have a first power supply voltage applied thereto and the second power-supplied terminal is brought into contact with the second power supply terminal to have a second power supply voltage applied thereto.

When the terminals are arranged in alignment with each other in the insertion direction, the second power supply terminal of the host device and the first power-supplied terminal of the optical communication module are temporarily brought into contact with each other at the time of inserting or removing the optical communication module. This contact adversely causes, as shown in FIG. 8, the first power-supplied terminal of the optical communication module to be temporarily supplied with a power supply voltage of VCC2, which is not supposed to be supplied thereto, from the second power supply terminal of the host device. Such a situation causes a malfunction of the optical communication module or a failure in an internal circuit or an integrated circuit used therein.

In view of this, there may be a point in that the first power supply terminal and the second power supply terminal are electrically connected to each other, a point in that the first power supply terminal and the second power supply terminal are arranged in close proximity to each other, and a point in that a delay circuit is used to reduce the risk of adversely supplying a power supply voltage that is not supposed to be supplied.

It may be uncertain which of the two lines of power supply paths is to be supplied with power first, and hence switches are arranged on both the two power supply paths. However, provision of the switches on both the paths leads to increases in circuit scale and cost.

Further, when the first power supply terminal and the second power supply terminal are electrically connected to each other or when the first power supply terminal and the second power supply terminal are arranged in close proximity to each other, the power supply voltages to be supplied to the first power supply terminal and the second power supply terminal are required to be the same. This inhibits different power supply voltages from being supplied to the first power supply terminal and the second power supply terminal.

Even when the same power supply voltage is supplied, a voltage is intermittently supplied to the first power supply terminal, and hence a surge current flows inside the optical communication module, to thereby cause a failure. In addition, even through use of the delay circuit, when the optical communication module is inserted at a low speed, there is a fear in that a power supply voltage that is not supposed to be supplied may be supplied to the first power supply terminal.

SUMMARY

According to some possible implementations, an optical communication module includes a first power-supplied terminal to be brought into contact with a first power supply terminal to have a first power supply voltage applied thereto, the first power supply terminal being included in a host device in which the first power supply terminal and a second power supply terminal, located closer to an opening of the host device than the first power supply terminal, are provided so as to be aligned with each other in an insertion direction of the optical communication module; a second power-supplied terminal to be brought into contact with the second power supply terminal to have a second power supply voltage applied thereto; a signal processing circuit, which is connected to the first power-supplied terminal and the second power-supplied terminal, configured to perform processing on a signal; and a power control circuit, which is provided between the first power-supplied terminal and the signal processing circuit, configured to control connection between the first power-supplied terminal and the signal processing circuit based on a voltage applied to the second power-supplied terminal.

According to some possible implementations, it is possible to reduce the manufacturing cost of the optical communication module capable of being inserted and removed, which includes the power-supplied terminals arranged so as to be aligned with each other in its insertion direction into the host device. It is also possible to reduce the possibility of the occurrence of a failure or a malfunction.

BRIEF DESCRIPTION OF THE DRAWINGS

FIG. 1 is a functional block diagram of an optical communication module according to an example.

DETAILED DESCRIPTION

Figure 2A:
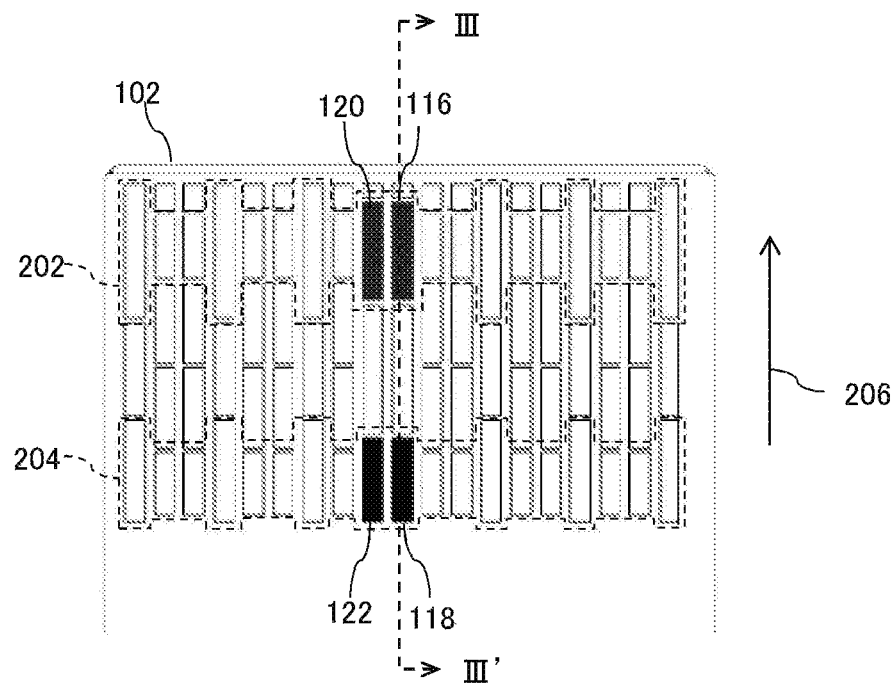
FIG. 2A and FIG. 2B are plan views for illustrating shapes of a terminal portion of the optical communication module according to an example.

The following detailed description of example implementations refers to the accompanying drawings. The same reference numbers in different drawings may identify the same or similar elements.

FIG. 1 is a functional block diagram for illustrating an optical communication module 100 according to at least one implementation. As illustrated in FIG. 1, the optical communication module 100 includes a terminal portion 102, a power control circuit 104, a signal processing circuit 106, an optical transmitter 108, an optical receiver 110, a calculation unit 112, and a reset circuit 114. Each of the components is formed, for example, on a printed circuit board. The optical communication module 100 is inserted into an opening of a host device 302 described later to have, for example, a first power supply voltage and a second power supply voltage applied thereto from the host device 302, and is configured to transmit and receive a signal to/from the host device 302.

In the terminal portion 102, a plurality of power-supplied terminals to be supplied with power from the host device 302, a plurality of signal reception terminals configured to receive signals from the host device 302, and a plurality of signal transmission terminals configured to transmit signals to the host device 302 are arranged. In at least one implementation, the power-supplied terminals include a first power-supplied terminal 116, a second power-supplied terminal 118, a third power-supplied terminal 120, a fourth power-supplied terminal 122, a fifth power-supplied terminal 124, and a sixth power-supplied terminal 126. The signal reception terminals include first signal reception terminals p and n to fourth signal reception terminals p and n. The signal transmission terminals include first signal transmission terminals p and n to fourth signal transmission terminals p and n. The combination of p and n of the respective signal terminals indicates a pair of differential signals. The terminal portion 102 is described later in detail.

The power control circuit 104 is provided between a power-supplied terminal in a first row 202 and the signal processing circuit 106 to control connection between the power-supplied terminal in the first row 202 and the signal processing circuit 106 based on a voltage applied to a power-supplied terminal in a second row 204. The power control circuit 104 is described later in detail.

The signal processing circuit 106 is connected to each of the power-supplied terminals via the power control circuit 104 to perform processing on the signal. Specifically, first, the signal processing circuit 106 is supplied with power from each of the power-supplied terminals via the power control circuit 104. The signal processing circuit 106 also acquires an electric signal from the host device 302 via a signal reception terminal. The signal processing circuit 106 adjusts a phase between a clock and data included in the electric signal acquired from the host device 302, and discriminates the content of the received data. Then, the signal processing circuit 106 transmits the transmission data to the optical transmitter 108. Meanwhile, the signal processing circuit 106 acquires the reception data from the optical receiver 110, and discriminates the content of the data. The method of discriminating the content of the reception data may be a method of adjusting the phase of the reception data to a reference clock, or a method of extracting a reference clock from the reception data. The signal processing circuit 106 further includes a circuit including a waveform shaping circuit configured to shape the waveform of a current signal to be output based on an optical signal received by the optical receiver 110. The signal processing circuit 106 outputs the shaped current signal as an electric signal to the host device 302 via a signal transmission terminal.

The optical transmitter 108 transmits an optical signal based on the transmission data acquired from the signal processing circuit 106. Specifically, for example, the optical transmitter 108 includes a laser diode and a transmission circuit. The transmission circuit includes a drive circuit configured to supply a current to the laser diode to drive the laser diode. The optical transmitter 108 uses the laser diode to convert the transmission data acquired from the signal processing circuit 106 into an optical signal, and outputs the optical signal to the outside.

The optical receiver 110 receives an optical signal, converts the optical signal into a voltage signal, and then transmits the voltage signal to the signal processing circuit 106. Specifically, for example, the optical receiver 110 includes a light receiving element and an output circuit. The light receiving element receives an optical signal, and converts the optical signal into a current signal. The output circuit amplifies the optical signal received by the light receiving element. Thus, the optical receiver 110 converts the received optical signal into a voltage signal, and outputs the voltage signal to the signal processing circuit 106. The light receiving element may be, for example, a photodiode or an avalanche photodiode.

The calculation unit 112 controls each of the components included in the optical communication module 100. Specifically, for example, the calculation unit 112 monitors an operation state of the optical communication module 100 based on various kinds of information including operation states of the optical transmitter 108 and the optical receiver 110 and a power supply voltage supplied from the host device 302. In addition, when an abnormality occurs in the optical communication module 100, the calculation unit 112 generates an alarm signal corresponding to the abnormality. In this case, the calculation unit 112 performs operation control corresponding to the abnormality detected by the optical communication module 100 on the optical transmitter 108 and the optical receiver 110.

The reset circuit 114 is a circuit configured to hold the calculation unit 112 in a reset state until the calculation unit 112 is powered on and stabilized. The reset circuit 114 is a technology that has hitherto been used, and hence a detailed description thereof is omitted.

Figure 2B:
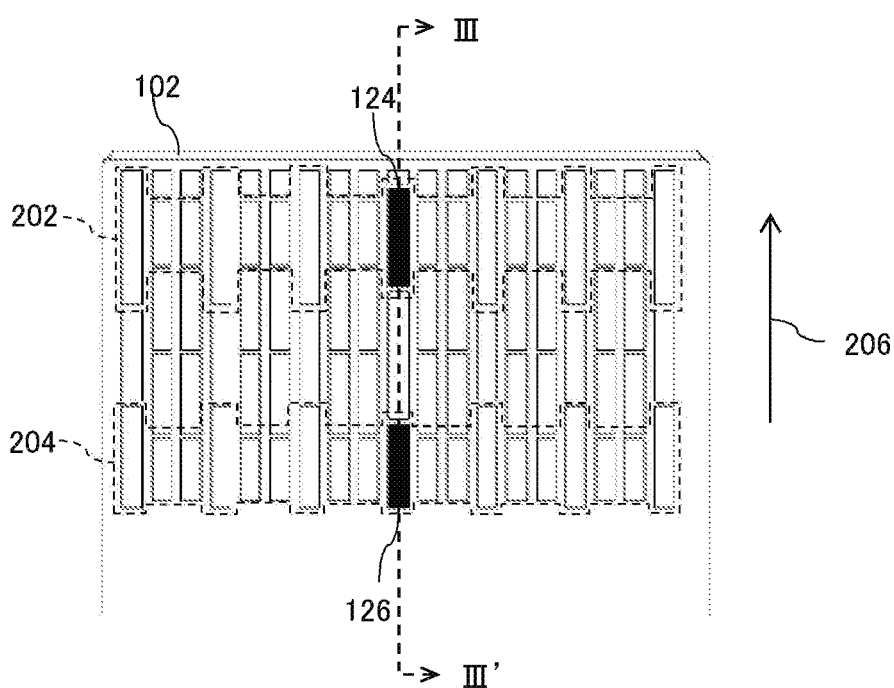
Figure 3A:
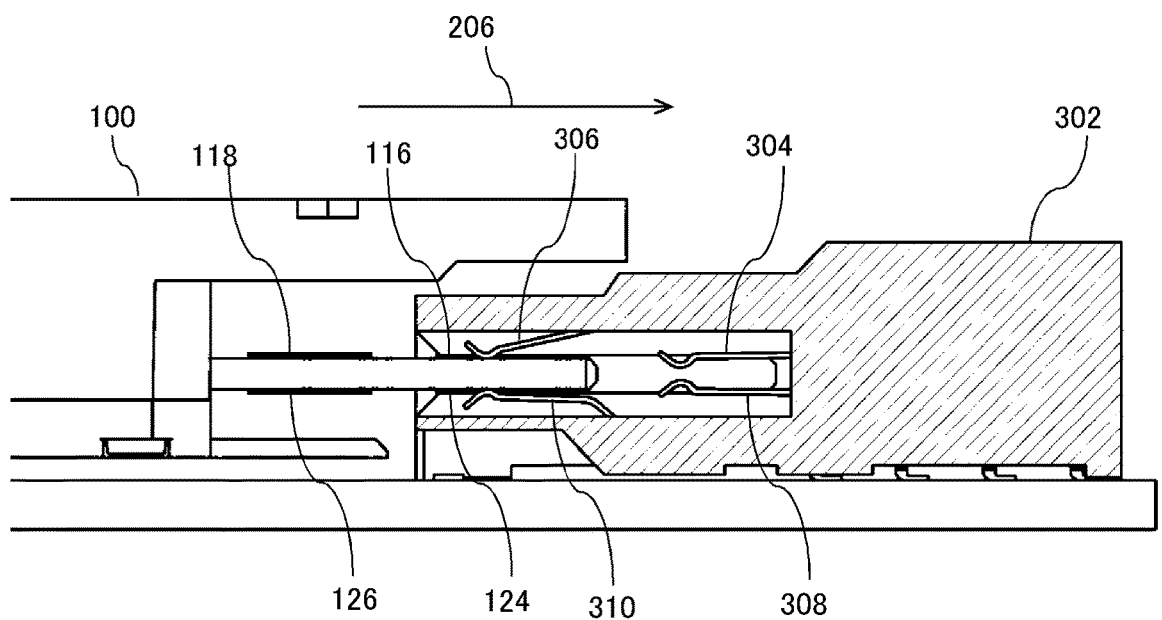
FIG. 3A and FIG. 3B are cross-sectional views of a host device and the optical communication module according to an example.
Figure 3B:
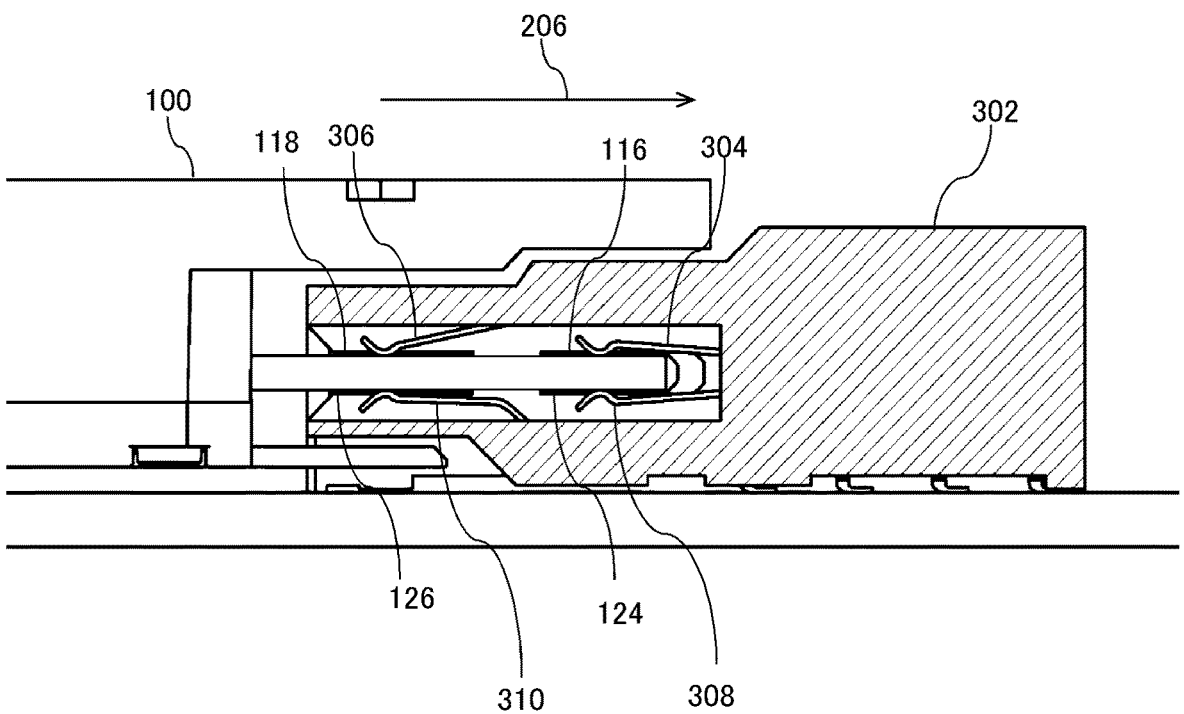

Next, the respective terminals arranged in the terminal portion 102 are described with reference to FIG. 2A to FIG. 3B. FIG. 2A is a plan view for illustrating a shape of a front surface of the terminal portion 102 of the optical communication module 100. FIG. 2B is a plan view for illustrating a shape of a back surface of the terminal portion 102 of the optical communication module 100. FIG. 3A is a cross-sectional view of the optical communication module 100 and the host device 302 in a state in which the optical communication module 100 is being connected to the host device 302. FIG. 3B is a cross-sectional view of the optical communication module 100 and the host device 302 in a state in which the optical communication module 100 has been completely connected to the host device 302. In this case, FIG. 3A and FIG. 3B are cross-sectional views taken along the line of FIG. 2A and FIG. 2B. In FIG. 2A and FIG. 2B, the host device 302 is arranged above the optical communication module 100 when viewing the drawings, and the optical communication module 100 is connected to an opening portion of the host device 302.

FIG. 2A and FIG. 2B are illustrations of an example of the form of the terminal portion 102, which is a layout of terminal arrangement defined by one standard in the optical communication industry. As illustrated in FIG. 2A to FIG. 3B, a plurality of terminals are arranged in the terminal portion 102 in two rows in alignment with each other toward an insertion direction 206 of the optical communication module 100. In this case, the insertion direction 206 of the optical communication module 100 is the upward direction of FIG. 2A and FIG. 2B when viewing the drawings, and the rightward direction of FIG. 3A and FIG. 3B when viewing the drawings. In the following description, it is assumed that the upper side of FIG. 2A and FIG. 2B when viewing the drawings and the right side of FIG. 3A and FIG. 3B when viewing the drawings are referred to as "first row 202", and the lower side of FIG. 2A and FIG. 2B when viewing the drawings and the left side of FIG. 3A and FIG. 3B when viewing the drawings are referred to as "second row 204".

As illustrated in FIG. 2A, the first power-supplied terminal 116 and the third power-supplied terminal 120 are provided in the first row 202 on the front surface of the terminal portion 102. The second power-supplied terminal 118 and the fourth power-supplied terminal 122 are provided in the second row 204 on the front surface of the terminal portion 102. The fifth power-supplied terminal 124 is provided in the first row 202 on the back surface of the terminal portion 102. The sixth power-supplied terminal 126 is provided in the second row 204 on the back surface of the terminal portion 102. Although not described in detail, a signal terminal and a GND terminal are provided in the terminal portion 102 at given positions defined by the standard.

In this case, the first power-supplied terminal 116 and the second power-supplied terminal 118 are arranged in alignment with each other toward the insertion direction 206 of the optical communication module 100. In the same manner, the third power-supplied terminal 120 and the fourth power-supplied terminal 122 are arranged in alignment with each other toward the insertion direction 206 of the optical communication module 100. In the same manner, the fifth power-supplied terminal 124 and the sixth power-supplied terminal 126 are arranged in alignment with each other toward the insertion direction 206 of the optical communication module 100.

As illustrated in FIG. 3A and FIG. 3B, in the host device 302, in order to align the terminals with each other in the insertion direction 206 of the optical communication module 100, a first power supply terminal 304 and a fifth power supply terminal 308 are provided in the first row 202, and a second power supply terminal 306 and a sixth power supply terminal 310 are provided in the second row 204 located closer to the opening than the first power supply terminal 304. Although not shown in FIG. 3A and FIG. 3B, a third power supply terminal is provided in the first row 202, and a fourth power supply terminal is provided in the second row 204. The first power supply voltage to a sixth power supply voltage are applied to the first power supply terminal 304 to the sixth power supply terminal 310 from a power generator (not shown) of the host device 302.

When the insertion of the terminal portion 102 of the optical communication module 100 is completed, the power supply terminals and their corresponding power-supplied terminals are brought into contact with each other. Thus, the optical communication module 100 is activated by being supplied with power from the host device 302. After the activation is completed, the optical communication module 100 is ready to communicate data to/from the host device 302 via the signal terminals.

As described above, the terminals of the host device 302 and the terminals of the optical communication module 100 are respectively arranged in two rows in alignment with each other in the insertion direction 206. Therefore, as illustrated in FIG. 3A, when the optical communication module 100 is inserted into the host device 302, the first power-supplied terminal 116 included in the first row 202 of the optical communication module 100 is temporarily brought into contact with the second power supply terminal 306 of the host device 302. At this time, the second power supply voltage is being applied to the first power-supplied terminal 116 from the second power supply terminal 306.

Then, as illustrated in FIG. 3B, when the insertion of the optical communication module 100 is completed, the first power-supplied terminal 116 of the optical communication module 100 is brought into contact with the first power supply terminal 304 of the host device 302. At the same time, the second power-supplied terminal 118 included in the second row 204 of the optical communication module 100 is brought into contact with the second power supply terminal 306 of the host device 302. That is, under the state in which the optical communication module 100 has been completely connected to the host device 302, the first power-supplied terminal 116 is brought into contact with the first power supply terminal 304 to have the first power supply voltage applied thereto. Meanwhile, the second power-supplied terminal 118 is brought into contact with the second power supply terminal 306 to have the second power supply voltage applied thereto.

In the same manner, under a state of having been inserted halfway, the third power-supplied terminal 120 included in the first row 202 of the optical communication module 100 is brought into contact with the fourth power supply terminal (not shown) included in the second row 204 of the host device 302, and unexpected power is supplied to the third power-supplied terminal 120. The same applies to the fifth power-supplied terminal 124 on the back surface.

As described above, under the state in which a power-supplied terminal in the first row 202 is in contact with a power supply terminal (for example, the second power supply terminal 306) in the second row 204 of the host device 302 while the optical communication module 100 is being inserted, undesired power is supplied to the power-supplied terminal in the first row 202. After that, the power-supplied terminal in the first row 202 falls out of contact with the power supply terminal of the host device 302. In addition, under the state in which the optical communication module 100 has been completely inserted into the host device 302, a power-supplied terminal in the first row 202 of the optical communication module 100 is brought into contact with the power supply terminal (for example, the first power supply terminal 304) in the first row 202 of the host device 302.

That is, power is intermittently supplied to a power-supplied terminal in the first row 202 of the optical communication module 100. In this case, the optical communication module 100 may malfunction, or an internal circuit may be damaged. When the optical communication module 100 in which power-supplied terminals are arranged in alignment with each other in the insertion direction 206 is used, at the time of inserting or removing the optical communication module 100, it is unavoidable that a power supply terminal on the host device 302 side that is not supposed to be connected to a power-supplied terminal of the optical communication module 100 is adversely connected to the power-supplied terminal. According to an implementation, the power control circuit 104 controls the connection between the power-supplied terminals arranged in the first row 202 and the signal processing circuit 106, to thereby be able to solve the above-mentioned problem.

Figure 4:
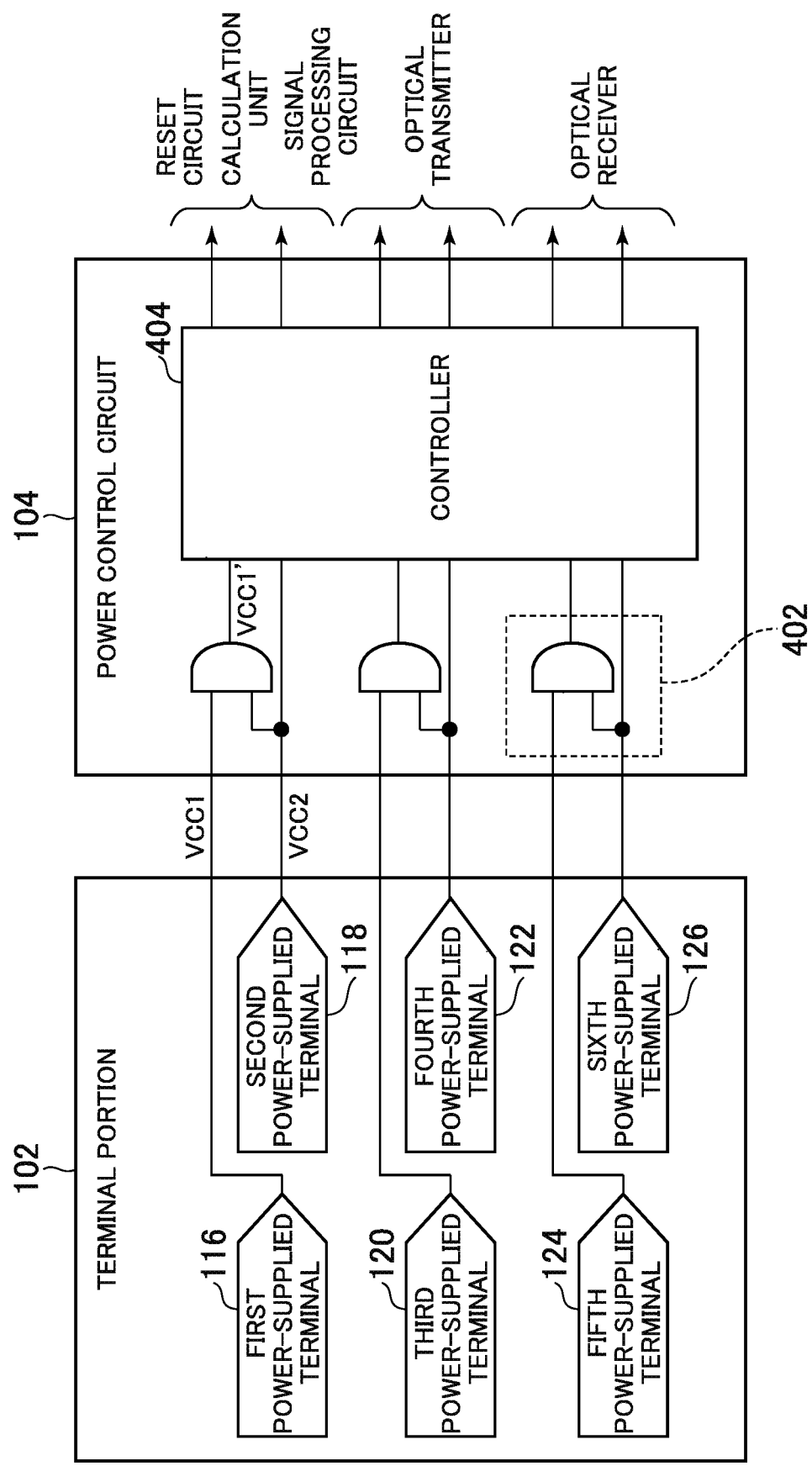
FIG. 4 is a functional block diagram of a power control circuit according to an example.

The operation performed by the power control circuit 104 is described with reference to FIG. 4. FIG. 4 is a functional block diagram of the power control circuit 104.

As illustrated in FIG. 4, the power control circuit 104 includes three connection circuits 402 and a controller 404. The connection circuit 402 is provided between the first power-supplied terminal 116 and the signal processing circuit 106, and controls the connection between the first power-supplied terminal 116 and the signal processing circuit 106 based on a voltage applied to the second power-supplied terminal 118.

Specifically, for example, the power control circuit 104 includes the connection circuit 402 configured to connect the first power-supplied terminal 116 and the signal processing circuit 106 to each other when the first power supply voltage and the second power supply voltage are applied to the first power-supplied terminal 116 and the second power-supplied terminal 118, respectively. The connection circuit 402 is, for example, an AND circuit. One of two input terminals of the AND circuit is connected to the first power-supplied terminal 116. The other is connected to the second power-supplied terminal 118. In the same manner, one of two input terminals of another AND circuit is connected to the third power-supplied terminal 120, and the other is connected to the fourth power-supplied terminal 122. One of two input terminals of still another AND circuit is connected to the fifth power-supplied terminal 124, and the other is connected to the sixth power-supplied terminal 126.

The controller 404 supplies the power supplied to the first power-supplied terminal 116 and the second power-supplied terminal 118 to the reset circuit 114, the calculation unit 112, and the signal processing circuit 106. The controller 404 supplies the power supplied to the third power-supplied terminal 120 and the fourth power-supplied terminal 122 to the optical transmitter 108. The controller 404 supplies the power supplied to the fifth power-supplied terminal 124 and the sixth power-supplied terminal 126 to the optical receiver 110. The controller 404 is, for example, a hot-swap IC. The controller 404 controls the power-on order of the signal processing circuit 106, the optical transmitter 108, the optical receiver 110, and other such components.

Figure 5:
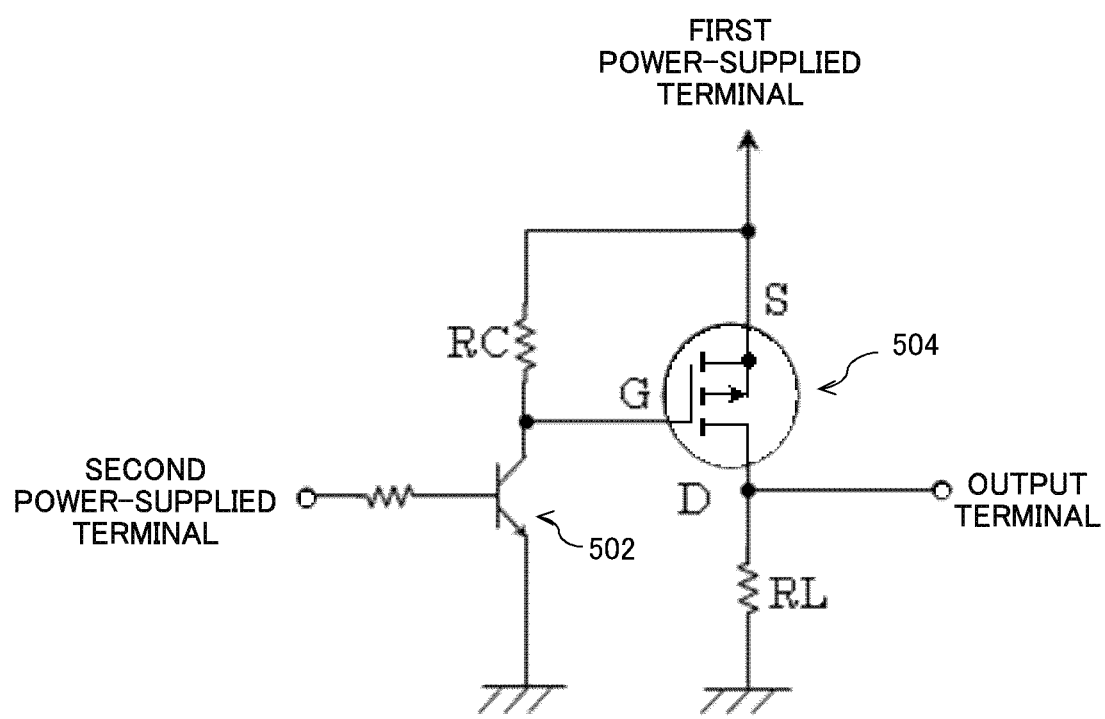
FIG. 5 is a diagram for illustrating an example of a circuit diagram of an AND circuit included in the power control circuit.

FIG. 5 is a diagram for illustrating an example of the connection circuit 402 in at least one implementation in which the connection circuit 402 is an AND circuit. FIG. 5 is a diagram for illustrating the AND circuit connected to the first power-supplied terminal 116 and the second power-supplied terminal 118 among the three AND circuits.

As illustrated in FIG. 5, the connection circuit 402 includes three resistors, a field effect transistor 504 (P-type MOSFET), and a bipolar transistor 502 (npn-type transistor). The bipolar transistor 502 has an emitter terminal grounded, has a base terminal connected to the second power-supplied terminal 118 via one of the resistors, and has a collector terminal connected to the first power-supplied terminal 116 via an RC resistor. The field effect transistor 504 has a drain terminal connected to an output terminal, has a source terminal connected to the first power-supplied terminal 116, and has a gate terminal connected to the collector terminal of the bipolar transistor 502. In addition, an RL resistor is provided between the drain terminal of the field effect transistor 504 and GND terminal.

Figure 6:
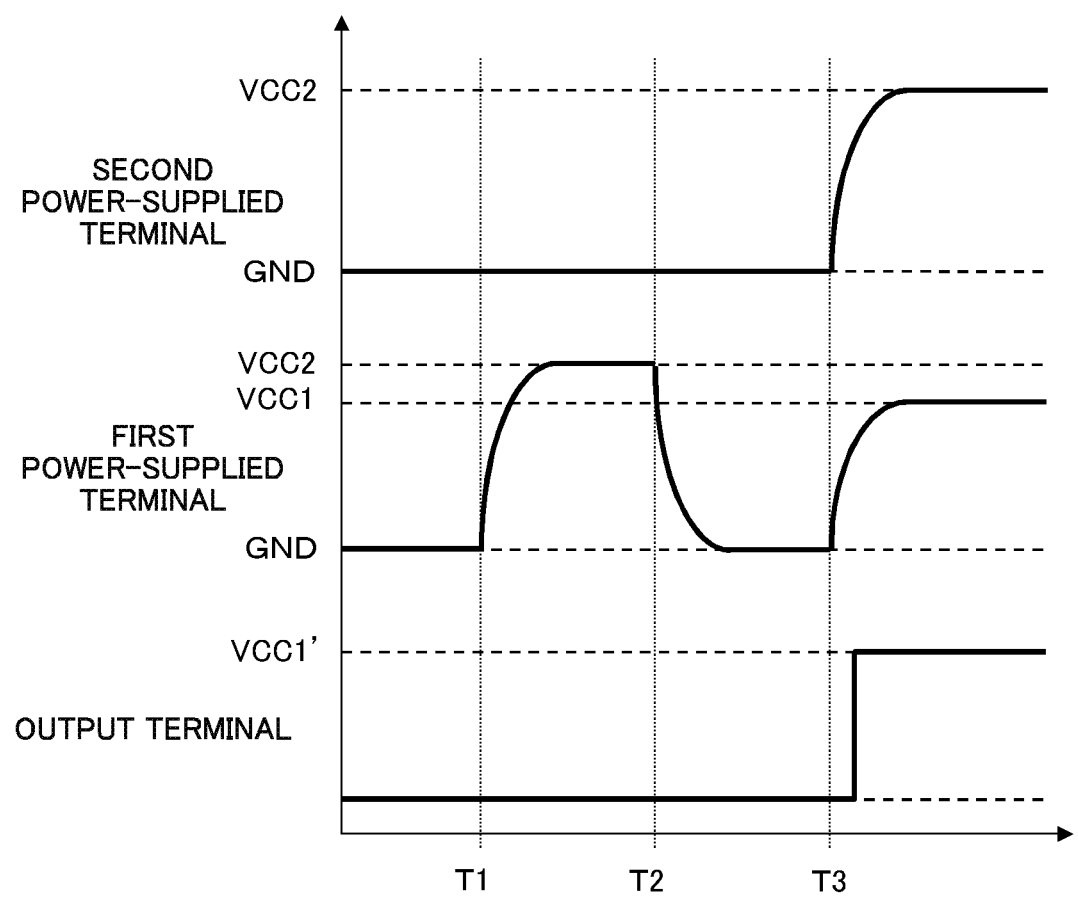
FIG. 6 is a timing chart of input voltages and an output voltage in the power control circuit.

The operation performed by the connection circuit 402 is described with reference to FIG. 6. FIG. 6 is a time sequence diagram for showing voltages at the first power-supplied terminal 116, the second power-supplied terminal 118, and the output terminal that are exhibited when the optical communication module 100 is inserted. It is assumed that the voltage at the first power supply terminal 304 is VCC1 and the voltage at the second power supply terminal 306 is VCC2.

As shown in FIG. 6, under a state before the optical communication module 100 is inserted into the host device 302, the first power-supplied terminal 116 and the second power-supplied terminal 118 are not in contact with the power supply terminals. Therefore, during a period until T1, the voltages at the first power-supplied terminal 116 and the second power-supplied terminal 118 are 0 V. When the voltage at the first power-supplied terminal 116 is 0 V, the field effect transistor 504 is in an off state. Therefore, the voltage at the output terminal of the AND circuit is 0 V during the period until T1.

When the optical communication module 100 is inserted into the host device 302, the first power-supplied terminal 116 of the optical communication module 100 and the second power supply terminal 306 of the host device 302 are brought into contact with each other at the time of T1. Thus, the power supply voltage of VCC2 is supplied from the second power supply terminal 306 to the first power-supplied terminal 116. Therefore, during a period from T1 to T2, the voltage at the first power-supplied terminal 116 becomes VCC2. Meanwhile, the second power-supplied terminal 118 is not in contact with any one of the power supply terminals. Therefore, the voltage at the second power-supplied terminal 118 is 0 V during the period from T1 to T2.

When the voltage at the second power-supplied terminal 118 is 0 V, no collector current flows through the collector terminal of the bipolar transistor 502. Thus, the bipolar transistor 502 is in an off state. In addition, no source current flows into the field effect transistor 504. Thus, even when the voltage at the first power-supplied terminal 116 is VCC2, the field effect transistor 504 is in an off state. Therefore, the voltage at the output terminal of the AND circuit is 0 V during the period from T1 to T2.

When the optical communication module 100 is further inserted, both the first power-supplied terminal 116 and the second power-supplied terminal 118 are not brought into contact with the power supply terminals during a period from T2 to T3. Therefore, during the period from T2 to T3, the voltages at the first power-supplied terminal 116 and the second power-supplied terminal 118 are 0 V. In the same manner as during the period until T1, the voltage at the output terminal of the AND circuit is 0 V during the period from T2 to T3.

At the time of T3 at which the optical communication module 100 is further inserted, the first power-supplied terminal 116 of the optical communication module 100 and the first power supply terminal 304 of the host device 302 are brought into contact with each other. Thus, the power supply voltage of VCC1 is applied from the first power supply terminal 304 to the first power-supplied terminal 116. At the same time, the second power-supplied terminal 118 of the optical communication module 100 is brought into contact with the second power supply terminal 306 of the host device 302. Thus, the power supply voltage of VCC2 is supplied from the second power supply terminal 306 to the second power-supplied terminal 118. Therefore, after T3, the voltage at the first power-supplied terminal 116 is VCC1, and the voltage at the second power-supplied terminal 118 is VCC2.

When the voltage at the first power-supplied terminal 116 is VCC1 and the voltage at the second power-supplied terminal 118 is VCC2, a base current flows into the base terminal of the bipolar transistor 502, and hence the bipolar transistor 502 is in an on state. In addition, the flowing of a current through the RC resistor causes a potential difference between the voltages at the gate terminal and the source terminal of the field effect transistor 504, and hence the field effect transistor 504 is in an on state. In this case, a potential difference occurs between both ends of the RL resistor. As a result, the voltage at the output terminal of the AND circuit becomes a voltage (VCC1' in the example shown in FIG. 6) uniquely determined by the currents flowing through the RL resistor and the source terminal of the field effect transistor 504.

According to at least one implementation described above, even in a case where the optical communication module 100 is standardized so that power-supplied terminals are arranged in two rows in alignment with each other in the insertion direction 206, at the time of the inserting or removing the optical communication module 100, even when the first power-supplied terminal 116, the third power-supplied terminal 120, and the fifth power-supplied terminal 124 are brought into contact with power supply terminals that are not supposed to be connected to the first power-supplied terminal 116, the third power-supplied terminal 120, and the fifth power-supplied terminal 124, respectively, it is possible to prevent a power supply voltage from being supplied to the inside of the optical communication module 100.

Thus, it is possible to prevent the power control circuit 104, the signal processing circuit 106, and other such components from being damaged when a voltage higher than a rated voltage is supplied to the power control circuit 104, the signal processing circuit 106, and other such components in a case where the first power supply voltage is higher than the second power supply voltage. It is also possible to prevent the respective components inside the optical communication module 100 from malfunctioning or being damaged due to, for example, a surge current caused by intermittent power supply as shown in FIG. 6 even when the first power supply voltage is the same as the second power supply voltage.

The case in which the optical communication module 100 is inserted into the host device 302 has been described above, but the same applies to a case in which the optical communication module 100 is removed from the host device 302. That is, the voltage at the output terminal of the AND circuit may become VCC1 only when the voltage at the first power-supplied terminal 116 is VCC1 and the voltage at the second power-supplied terminal 118 is VCC2.

Further, the operation performed by a connection circuit provided between the first power-supplied terminal 116 and the controller 404 has been described above, but a connection circuit provided between the third power-supplied terminal 120 and the controller 404 performs the same operation with the same configuration. That is, a connection circuit is further provided between the third power-supplied terminal 120 and the signal processing circuit 106 to control the connection between the third power-supplied terminal 120 and the signal processing circuit 106 based on a voltage applied to the fourth power-supplied terminal 122. In the same manner, a connection circuit is further provided between the fifth power-supplied terminal 124 and the signal processing circuit 106 to control the connection between the fifth power-supplied terminal 124 and the signal processing circuit 106 based on a voltage applied to the sixth power-supplied terminal 126.

In at least one implementation, a power-supplied terminal belonging to the first row 202 may be connected to only one of the input terminals of the AND circuit. Meanwhile, a power-supplied terminal belonging to the second row 204 is connected to the other input terminal of the AND circuit, and is also directly connected to a controller, which is a feature of at least one implementation. As described above, the first row 202 is subjected to power-on two times while the optical communication module 100 is inserted into or removed from the host device 302, which may cause a malfunction and voltage breakdown. Therefore, an AND circuit is provided to prevent a voltage from being applied to a signal processing circuit, an optical transmitter, and other such components at the subsequent stage before an expected connection state (state of having been fully inserted into the host device) is achieved. Meanwhile, a power-supplied terminal belonging to the second row 204 may be connected only to a power supply terminal in the second row that is supposed to be connected to the power-supplied terminal at the time of the insertion or removal, and hence it is not required to provide an AND circuit or another such prevention mechanism between the power-supplied terminal and a circuit or another such component at the subsequent stage. In a case of a mechanism in which entire power is simply turned on after a plurality of power supplies are turned on, it is required to provide an AND circuit for every power-supplied terminal. However, when a plurality of power supply terminals are arranged in an insertion or removal direction as in at least one implementation, an AND circuit may be connected only on one side, which produces remarkable effects in terms of cost reduction and omission of component arrangement space.

Figure 7:
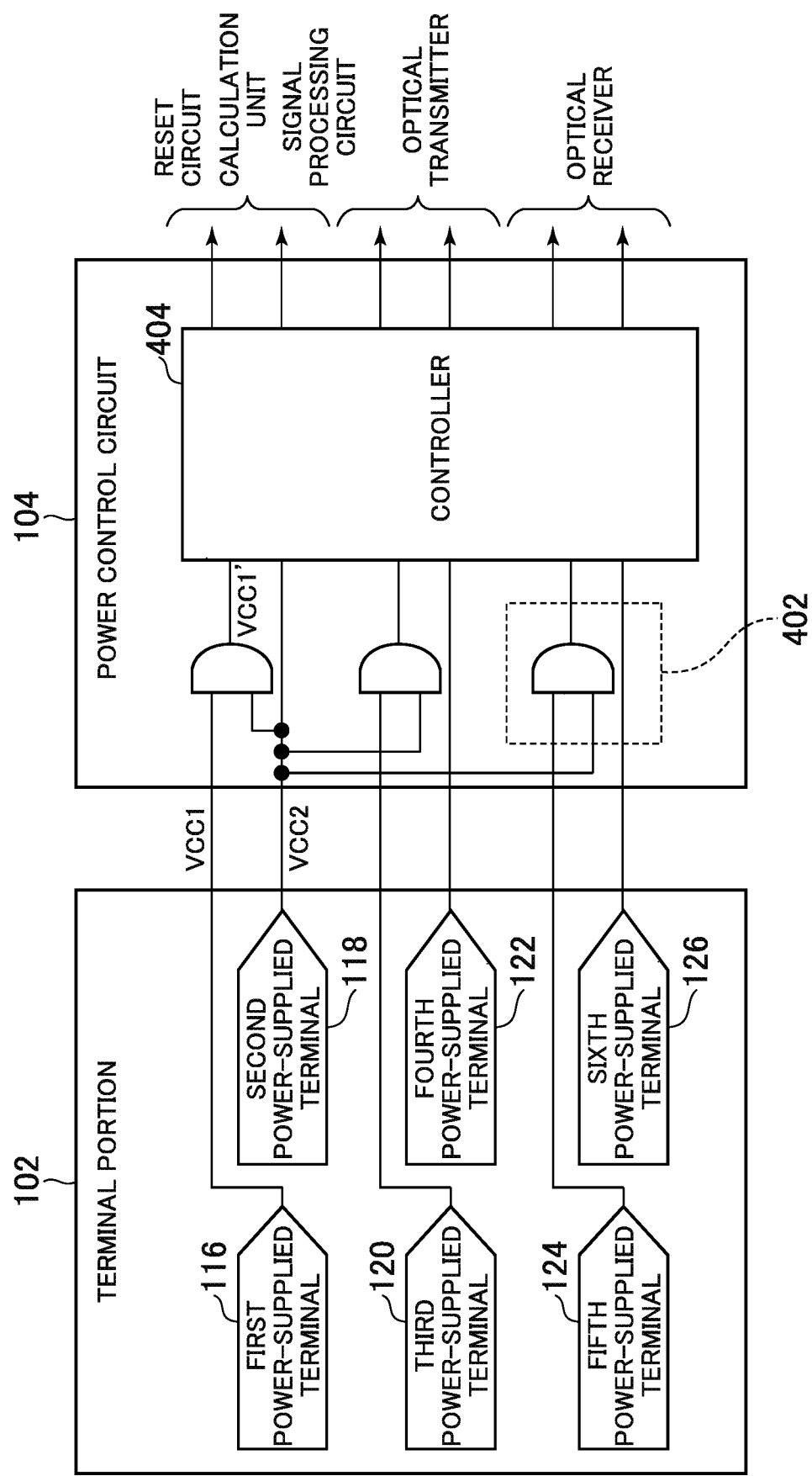
FIG. 7 is a functional block diagram of a power control circuit in a modification example.
Figure 8:
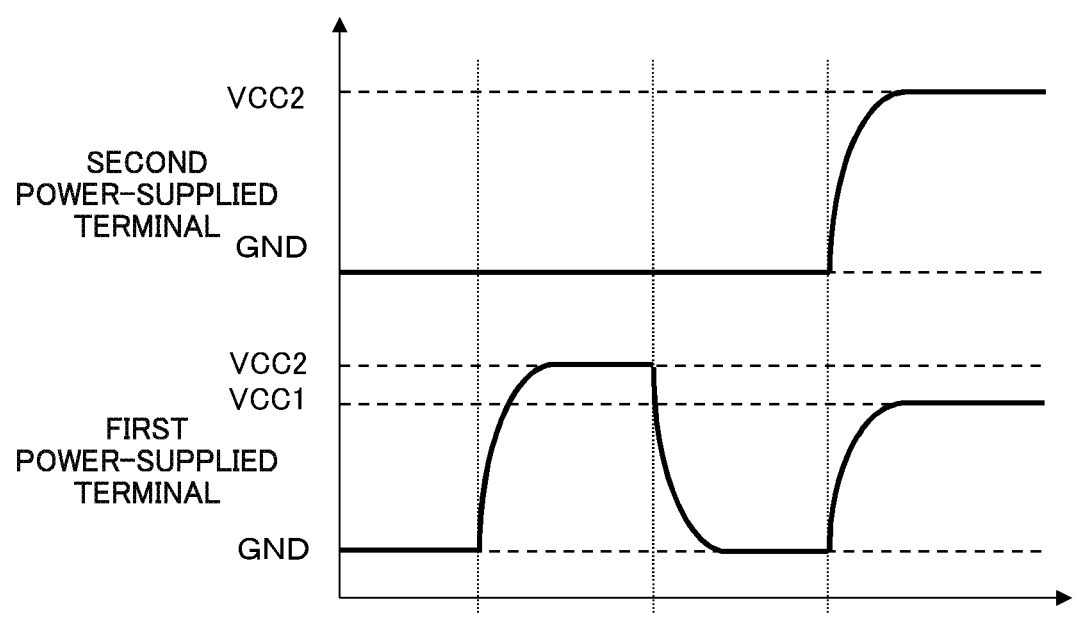
FIG. 8 is a timing chart of power supply voltages supplied to power-supplied terminals.

It should be understood that various changes, modifications, or substitutions are encompassed by the present description. For example, the power control circuit 104 may be further provided between the third power-supplied terminal 120 and the signal processing circuit 106 to control the connection between the third power-supplied terminal 120 and the signal processing circuit 106 based on a voltage applied to the second power-supplied terminal 118. Specifically, for example, as illustrated in FIG. 7, an AND circuit provided between the third power-supplied terminal 120 and the signal processing circuit 106 may be connected to the second power-supplied terminal 118 and the third power-supplied terminal 120. In this case, the second power-supplied terminal 118 is connected to the source terminal of the field effect transistor 504, and the third power-supplied terminal 120 is connected to the base terminal of the bipolar transistor 502 via a resistor.

As illustrated in FIG. 2A and FIG. 2B, the respective terminals arranged in the first row 202 are arranged in alignment with each other in a direction perpendicular to the insertion direction 206. Therefore, at the time of the inserting or removing the optical communication module 100, power supply voltages are supplied to the second power-supplied terminal 118 and the fourth power-supplied terminal 122 at substantially the same timing. Therefore, in this modification example as well, even when the third power-supplied terminal 120 is brought into contact with the forth power supply terminal, it is possible to prevent a power supply voltage from being supplied to the inside of the optical communication module 100 from the third power-supplied terminal 120.

The power control circuit 104 may be formed of an FPGA, a CPLD, or a microcomputer including a built-in AD converter or a built-in DA converter, or may be configured by another method.

Further, the connection circuit 402 in at least one implementation is an AND circuit including an N-type MOSFET, but may be configured by another component.

Further, the connection circuit 402 may be a relay circuit. Specifically, for example, the connection circuit 402 may be a relay circuit configured to supply the controller 404 and the signal processing circuit 106 with the first power supply voltage supplied to the first power-supplied terminal 116 in response to the supply of the second power supply voltage to the second power-supplied terminal 118.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical communication module comprising:
   a first power-supplied terminal to be inserted, along an insertion direction, into an opening of a host device and brought into contact with a first power supply terminal of the host device to have a first power supply voltage applied thereto;
   a second power-supplied terminal to be inserted, along the insertion direction, into the opening and brought into contact with a second power supply terminal of the host device to have a second power supply voltage applied thereto,
      wherein the second power-supplied terminal is aligned with the first power-supplied terminal along the insertion direction, and
      wherein the second power supply terminal is located closer to the opening of the host device than the first power supply terminal;
   a signal processing circuit, which is connected to the first power-supplied terminal and the second power-supplied terminal, configured to perform processing on a signal; and
   a power control circuit, which is provided between the first power-supplied terminal and the signal processing circuit, configured to control connection between the first power-supplied terminal and the signal processing circuit based on the second power supply voltage applied to the second power-supplied terminal.

2. The optical communication module of claim 1, wherein the power control circuit includes one of an AND circuit or a relay circuit, and
   wherein the power control circuit is configured to connect the first power-supplied terminal and the signal processing circuit to each other when the first power supply voltage is applied to the first power-supplied terminal and the second power supply voltage is applied to the second power-supplied terminal.

3. The optical communication module of claim 1, further comprising:
   a third power-supplied terminal to be brought into contact with a third power supply terminal to have a third power supply voltage applied thereto,
      the third power supply terminal being provided in the host device so as to be aligned with the first power supply terminal in a direction perpendicular to the insertion direction; and
   a fourth power-supplied terminal to be brought into contact with a fourth power supply terminal to have a fourth power supply voltage applied thereto,
      the fourth power supply terminal being provided in the host device so as to be aligned with the second power supply terminal in the direction perpendicular to the insertion direction.

4. The optical communication module of claim 3, wherein the third power-supplied terminal and the fourth power-supplied terminal are arranged so as to be aligned with each other in the insertion direction of the optical communication module.

5. The optical communication module of claim 3, wherein the power control circuit is provided between the third power-supplied terminal and the signal processing circuit and is configured to control connection between the third power-supplied terminal and the signal processing circuit based on the fourth power supply voltage applied to the fourth power-supplied terminal.

6. The optical communication module of claim 1, further comprising:
   a third power-supplied terminal to be brought into contact with a third power supply terminal to have a third power supply voltage applied thereto,
      the third power supply terminal being provided in the host device so as to be aligned with the first power supply terminal in a direction perpendicular to the insertion direction.

7. The optical communication module of claim 6, further comprising:
   a fourth power-supplied terminal to be brought into contact with a fourth power supply terminal to have a fourth power supply voltage applied thereto,
      the fourth power supply terminal being provided in the host device so as to be aligned with the second power supply terminal in the direction perpendicular to the insertion direction.

8. The optical communication module of claim 7,
   wherein the third power-supplied terminal and the fourth power-supplied terminal are arranged so as to be aligned with each other in the insertion direction of the optical communication module, and
   wherein the power control circuit is provided between the third power-supplied terminal and the signal processing circuit and is configured to control connection between the third power-supplied terminal and the signal processing circuit based on the second power supply voltage applied to the second power-supplied terminal.

9. The optical communication module of claim 1, wherein the first power supply voltage has one of a value equal to that of the second power supply voltage or a value higher than that of the second power supply voltage.

10. The optical communication module of claim 1, where the optical communication module is to be inserted into the opening to have the first power supply voltage and the second power supply voltage applied thereto from the host device and is configured to transmit and receive a signal to/from the host device.

\* \* \* \* \*